(12) United States Patent
Goldobin et al.

(10) Patent No.: US 8,484,427 B1
(45) Date of Patent: *Jul. 9, 2013

(54) SYSTEM AND METHOD FOR EFFICIENT BACKUP USING HASHES

(75) Inventors: Maxim V. Goldobin, Moscow (RU);
Maxim V. Lyadvinsky, Moscow (RU);
Serguei M. Beloussov, Singapore (SG);
Alexander G. Tormasov, Moscow (RU);
Yuri S. Per, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 255 days.

This patent is subject to a terminal disclaimer.

(21) Appl. No.: 13/021,818

(22) Filed: Feb. 7, 2011

Related U.S. Application Data (63) Continuation-in-part of application No. 12/643,076, filed on Dec. 21, 2009, now Pat. No. 7,886,120, which is a continuation of application No. 11/757,442, filed on Jun. 4, 2007, now Pat. No. 7,636,824.

(60) Provisional application No. 60/806,088, filed on Jun. 28, 2006.

(51) Int. Cl.
*G06F 12/00* (2006.01)

(52) U.S. Cl.
USPC .............................. 711/162; 711/161; 711/216

(58) Field of Classification Search
USPC ......................................... 711/161–162, 216
See application file for complete search history.

(56) References Cited

U.S. PATENT DOCUMENTS

| | | | |
|---|---|---|---|
| 5,559,991 A | 9/1996 | Kanfi | |
| 6,928,526 B1 | 8/2005 | Zhu et al. | |
| 7,143,251 B1 | 11/2006 | Patterson | |
| 7,464,234 B1 | 12/2008 | Stringham | |
| 2004/0143713 A1 | 7/2004 | Niles et al. | |

*Primary Examiner* — Jasmine Song
(74) *Attorney, Agent, or Firm* — Fish & Richardson P.C.

(57) ABSTRACT

A method for data backup including (a) forming an image of the storage device; (b) for each block to be backed up to the image, generating a hash; (c) for each block stored in the image, storing a hash in a hash table; (c) for each additional block of the storage device to be backed up, generating a hash; (d) sorting all the generated hashes and deleting duplicate hashes; (e) comparing the hashes to identify candidate blocks that might have identical contents with contents of blocks stored in the image; (f) if the hashes are not coincident, then backing up, to the image, contents of unidentified blocks and blocks that do not have identical hashes, and (g) otherwise, storing links in the image instead of the contents of the blocks, (h) after checking all the hashes for those blocks that need to be backed up, writing only unique hashes to the hash table; (h) links for multiple blocks with identical contents point to a single block in the image, (i) the image contains a bitmap of the backup; (j) the bitmap contains indicators for the links that define if a block contains the content or if the block points to another block, (k) also indicators that reflect used and unused blocks such that an indicator whether contents are shared with another block vs. contents are unique to every other block in the image.

12 Claims, 8 Drawing Sheets

SYSTEM AND METHOD FOR EFFICIENT BACKUP USING HASHES

CROSS-REFERENCE TO RELATED APPLICATIONS

This application is a continuation in part of U.S. patent application Ser. No. 12/643,076, filed on Dec. 21, 2009, entitled SYSTEM AND METHOD FOR EFFICIENT BACKUP USING HASHES, now U.S. Pat. No. 7,886,120, which is a continuation of U.S. patent application Ser. No. 11/757,442, filed on Jun. 4, 2007, entitled SYSTEM AND METHOD FOR EFFICIENT BACKUP USING HASHES, now U.S. Pat. No. 7,636,824, which is a non-provisional of U.S. Provisional Patent Application No. 60/806,088, filed Jun. 28, 2006, entitled SYSTEM AND METHOD FOR EFFICIENT POST-DEFRAGMENTATION BACKUP USING HASHES, which are both incorporated herein by reference in their entirety.

BACKGROUND OF THE INVENTION

1. Field of the Invention

The present invention relates to backups, and, more particularly, to optimizing backup overhead for defragmented disks.

2. Related Art

One of the problems with conventional backup schemes relates to defragmentation of the disk drive. As a practical matter, most large files are not stored on a disk sequentially. This is due to the fact that as files are added to the drive and deleted from the disk drive, free blocks become available, which the operating system then uses to store pieces of the file, wherever space is available. Thus, a single file can be broken up into a number of blocks, stored at different locations on the disk drive. When the file is accessed, those blocks are collected, and put back together into the original file. This operation involves overhead, and therefore it is desirable to have files whose blocks are stored sequentially, wherever possible. The process that rearranges the stored blocks on the disk, so that the blocks of the files are stored sequentially, to the extent possible, is called "defragmentation."

Defragmentation can be performed relatively often, particularly in a server environment, where the server maintains a large number of files that constantly change. The problem with defragmentation and backups is that as far as the backup software is concerned, after the disk drive has been defragmented, it essentially needs to be backup all over again—from the perspective of the backup software, it is no longer possible to do an incremental backup, since such a large number of files have "changed." This is despite the fact that the actual content of the files does not change at all—only the locations of the blocks that make up the file change. Therefore, an unnecessary complete (or near complete) backup needs to be performed after defragmentation, incurring considerable additional overhead due to the backup process.

Hierarchical Storage Management (HSM) system is known for backing up content of storage devices on different storage media. There are also conventional methods for investigating and using patterns in data processing. For example, the Ziv, Lempel and Welch algorithms implemented for data compression use detection of exact repetitions of data strings, and storing only a single instance of repeated string. This method uses limited spaces for storing content of repeated blocks and could not be used with acceptable performance for identification contents of long random data sequences similar to blocks of the storage devices.

Accordingly, there is a need in the art for the method of backing up large amounts of data storage device data with high performance and reliability.

SUMMARY OF THE INVENTION

The present invention relates to a system and method for efficiently handling post-defragmentation backup that substantially obviates one or more of the disadvantages of the related art.

In particular, one embodiment of the invention improves usage of storage resources while backing up mass storages of set of workstations usually having similar data being stored. Another area where efficiency of the backup storage can be improved is servers and workstations, with frequently updated software, where new versions often contain same files as the prior version. For example, a group of servers with the same operating system and sets of software (e.g., web servers) may be backed up with improved efficiency of storage space usage.

More particularly, in an exemplary embodiment of the present invention, a method, system and computer program product for method for data backup such that for each block of a storage device to be backed up to an image, where the storage device can be restored from the image, generating a hash function value corresponding to contents of that block; generating a map of links between blocks in the image and corresponding blocks the storage device; using the hash function values to identify blocks of the storage device with identical contents, such that links for the blocks in the storage device with identical contents point to a single block in the image; and modifying the link in the map when a block in the storage is moved (for example, due to defragmentation) but its contents is not altered, so that the link points to the same backed up block.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings.

The present invention is related to a utility for backing up data. The utility works on a data block level, where "blocks" can refer to some basic unit of storage space on a disk, such as disk sectors, or clusters or similar aggregates of sub-units. In some embodiments, a "block" for hash calculation may be defined as a chain of clusters or other sub-units. In other words, "blocks" are basic data units defined either by hardware (e.g., sectors), by software (e.g., clusters) or by the backup application (e.g., chains).

It should be understood that although the term "storage drive" is used for description of hard drive, the actual storage medium at issue does not need to be an entire disk drive (or even a disk drive as such). It can be a logical drive, a flash drive, a partition of a disk drive assigned to a particular server, or a partition assigned to a particular virtual private server. It can also be a network drive or a portion of a network drive, or it can be a distributed storage system that acts as a single logical drive. The relevant point is that from the perspective of an operating system, a device exists and acts analogously to a hard disk drive or drive partition that can be accessed using operating system mechanisms that access storage devices and appropriate device drivers.

Figure 1A:
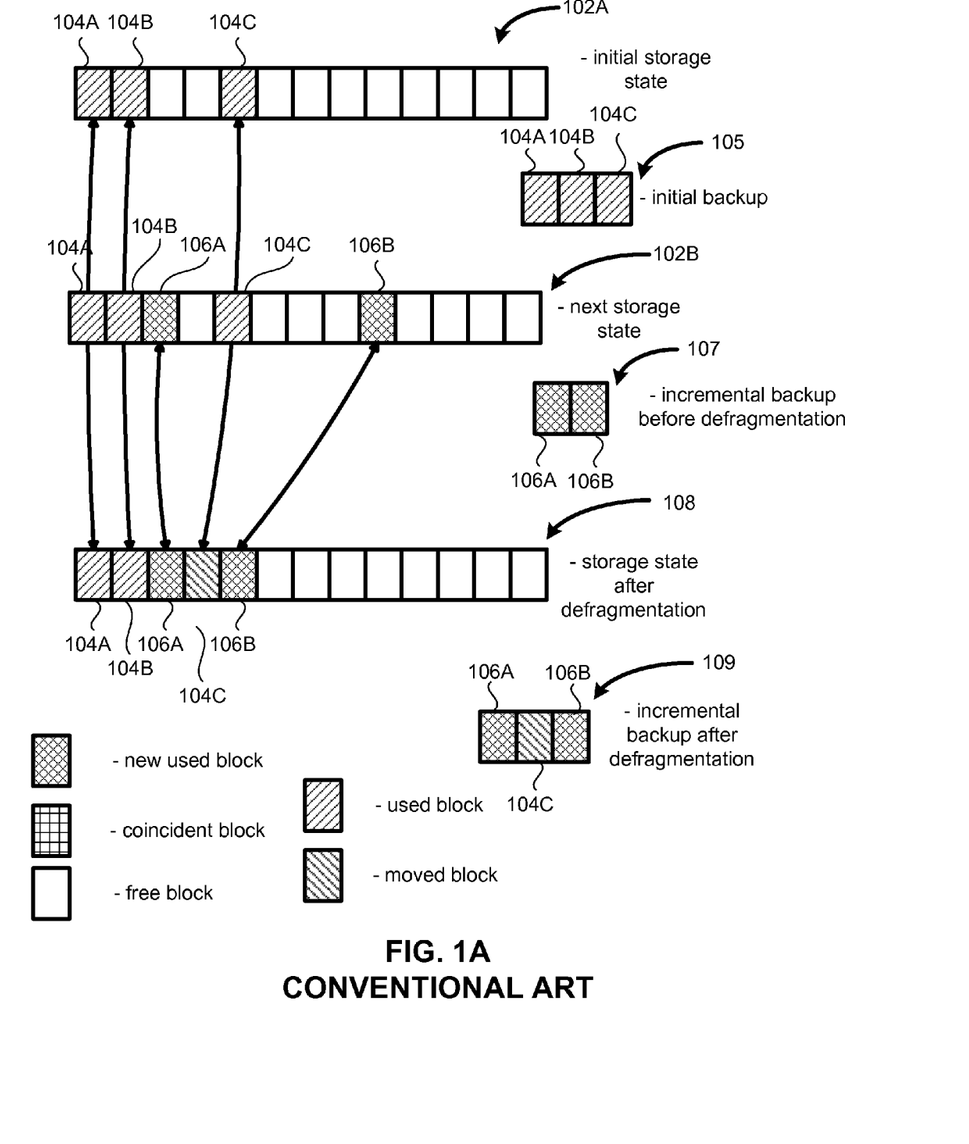
FIG. 1A illustrates a conventional backup, in the form of block data backup.

FIG. 1A illustrates a conventional backup, in the form of block data backup. As shown in FIG. 1A, the initial state of the storage device, such as a disk drive, is designated by 102A. The storage device has three blocks that have useful data, designated 104A, 104B and 104C (obviously, any realistic disk drive has many more than three blocks). An initial backup of 105 of the storage device would store blocks 104A-104C. These blocks may be next to each other on the backup drive, although this need not be the case all the time.

As further shown in FIG. 1A, in the next state 102B, two additional blocks have been added to the initial storage state 102A, these being blocks 106A and 106B. The incremental backup 107 before defragmentation would involve saving the blocks 106A, 106B to the disk image. After the storage drive has been defragmented, see state 108, the incremental backup involves three blocks in this example—106A, 104C and 106B. Block 104C is backed up to the image because it has been moved, not because any of its contents has changed. Here, in reality, only descriptions of the previously existing blocks are changed, along with the description of the physical block, where the old block is moved. This, therefore, illustrates the additional and unnecessary overhead involved with backing up defragmented drives.

Figure 1B:
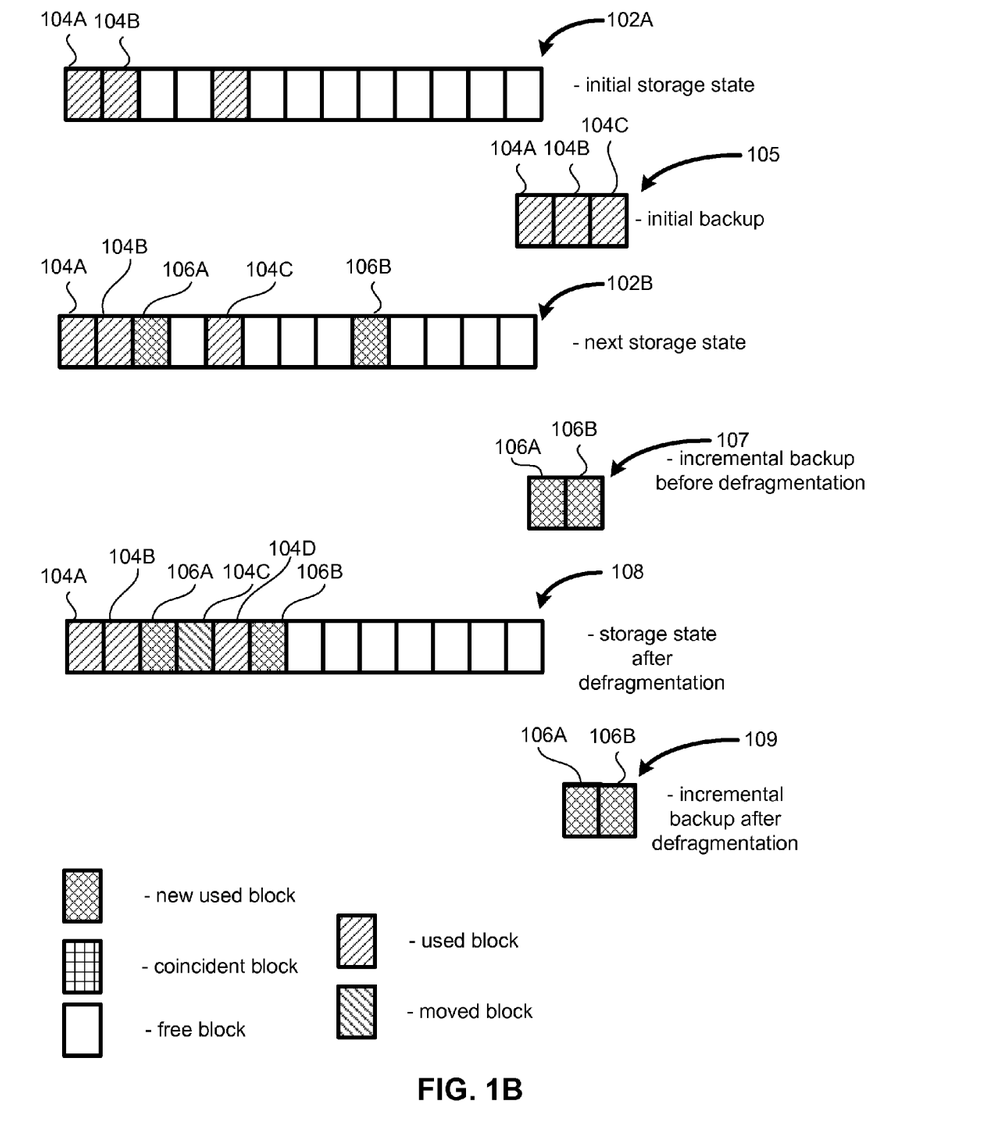
FIG. 1B illustrates how FIG. 1A would be modified in the present invention, notwithstanding the defragmentation process.

FIG. 1B illustrates the situation that would be desirable to have, notwithstanding the defragmentation process. As shown in FIG. 1B, the blocks at issue are the same as in FIG. 1A, and the incremental backup 109 should only be performed for the two added blocks 106A, 106B, and nothing else. In FIG. 1B, the arrows illustrate pointers, or correspondence of the block on the drive being backed up, and a block in the disk image.

Figure 2:
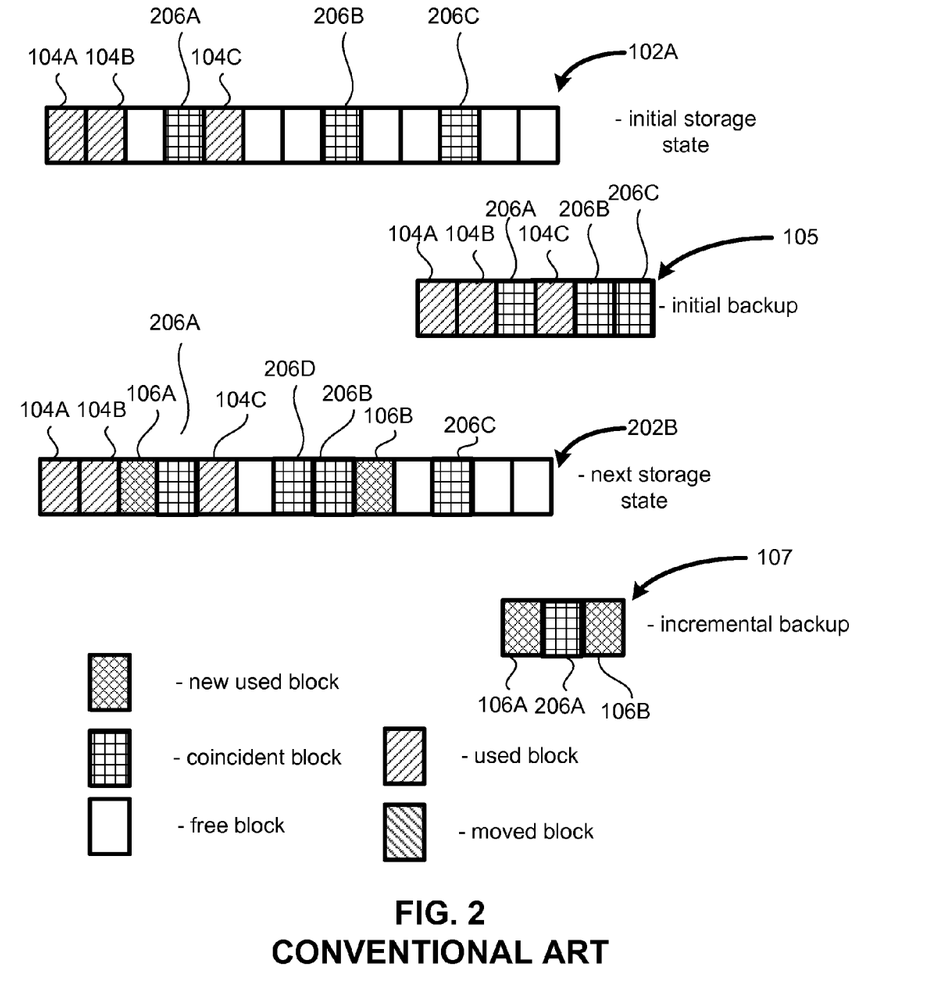
FIG. 2 illustrates another example of how conventional backup software systems handle the situation of several blocks containing the same data.

FIG. 2 illustrates another example of how conventional backup software systems handle the situation of several blocks containing the same data. In this case, blocks 206A, 206B and 206C have identical contents. The initial backup 105 contains the three blocks 104A-104C, and the three blocks 206A-206C. Considering the next storage stage 202B, where another block 206D has been added (with the same content as blocks 206A-206C), as well as the two added blocks 106A, 106B. The incremental backup 107 would involve three blocks 106A, 206A and 106B, notwithstanding the fact that there is already a copy of block 206 in the image. Note that the initial backup can be created using links to coincident blocks.

Figure 3:
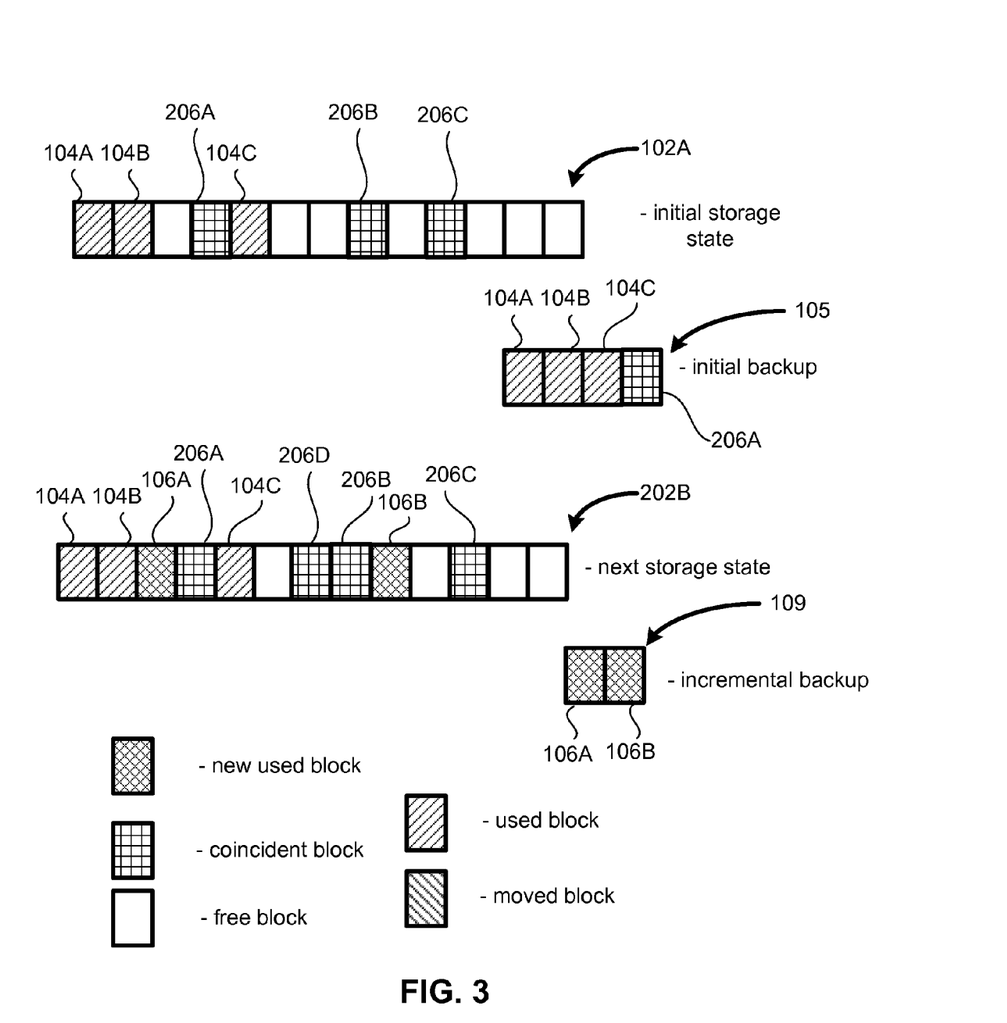
FIG. 3 illustrates how the situation shown in FIG. 2 would be handled according to one embodiment of the present invention.

FIG. 3 illustrates how the situation shown in FIG. 2 would be handled according to one embodiment of the present invention. As shown in FIG. 3, the initial state of the storage has the same six blocks—104A-104C, and 206A-206C, which are identical. The initial backup therefore needs to only consist of four blocks—104A-104C and a single block 206. In the next storage state 202B, two new blocks 106A, 106B have been added, and also one more block 206 (in this case, labeled 206D) has been added. In this case, however the incremental backup 109 only needs to save the contents of the two blocks 106A, 106B.

Figure 4:
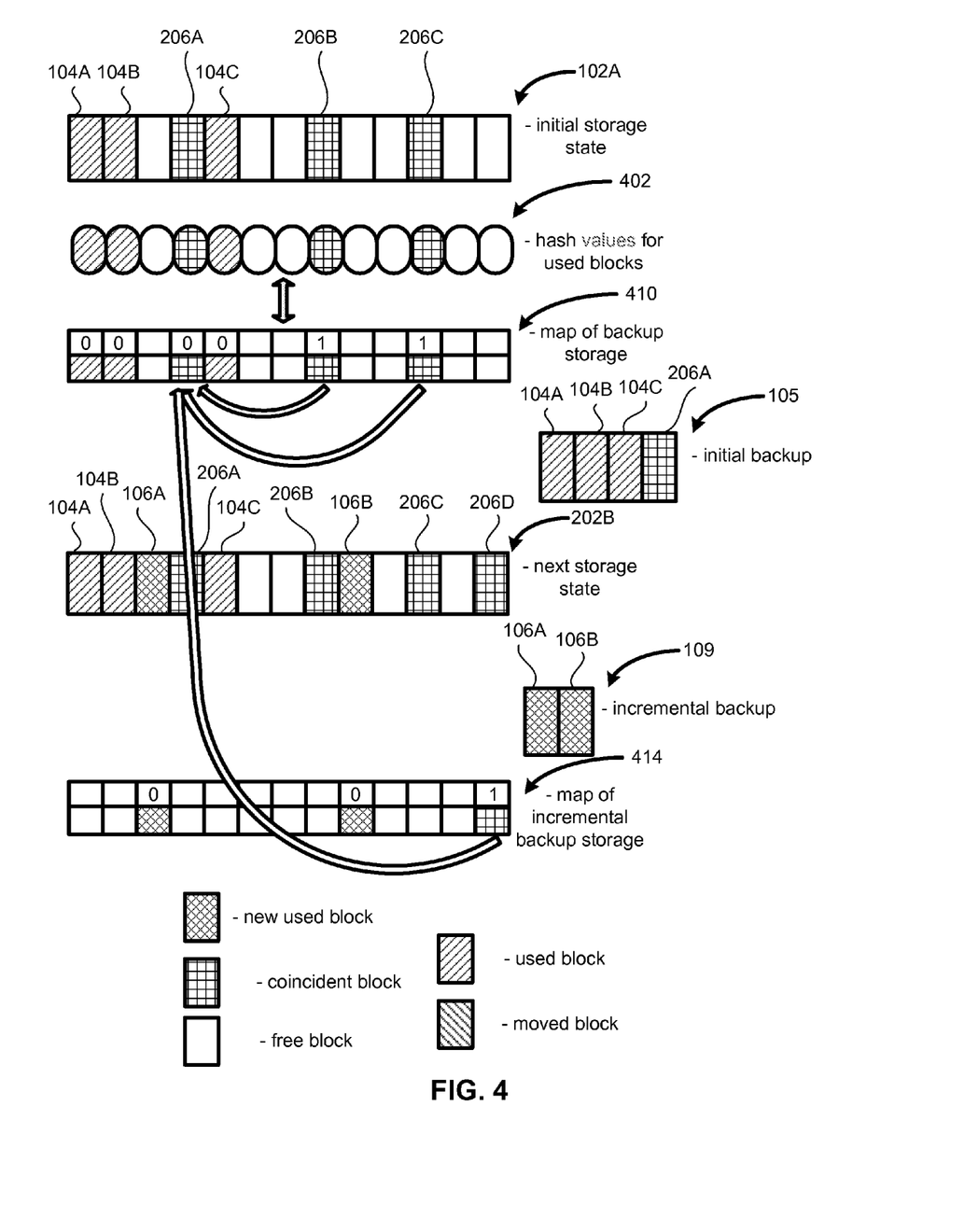
FIG. 4 illustrates how hashes are used to accomplish the backup of FIG. 3.

FIG. 4 illustrates one embodiment of how this goal is accomplished. As shown in FIG. 4, for each block of the initial storage stage 202A, a hash value, using, for example, common hash algorithms such as MD4, MD5, CRC, CRC32, SHA1, SHA2, SHA256, SHA512, Russian national standard GOST R 34.11-94 "Information Technology—Cryptographic Information Security—Hash Function" (incorporated herein by reference), an equivalent standard used by other member-states of the CIS, GOST 34.311-95 (incorporated herein by reference), hash function based on block ciphers and Message Authentication Code (MAC), etc., is calculated. More generally, other one-way functions can be used, such that the value of the function (for instance, the hash value in the case of hash functions) is virtually guaranteed to be unique for different block contents. Thus, the hash table 402 contains the hash values corresponding to the data of the blocks 104 and 206 of the initial storage state 102A. A map 410 keeps track of which blocks are unique, and which are duplicates. In the case of map values that correspond to the blocks 206B, 206C, the bit (1 or 0) indicates that the contents of the hash table is the same as for some other block and, therefore, in this case, the map (which contains addresses of the blocks in the disk image, or some other indicator or pointer to their location), points to the backup block 206A. Therefore, the initial backup 105 needs to only contain three blocks, 104A, 104B, 104C, and a single block 206A, which is identical to the blocks 206B and 206C. Rather than storing the blocks 206B, 206C themselves, the map 410 points to the block 206A instead.

202B in FIG. 4 illustrates the next storage state, where two blocks 106A, 106B have been added and block 206D has also been added. The incremental backup 109, as noted earlier, should only contain the two added blocks 106A, 106B. The incremental map 414, which illustrates the incremental backup (in other words, 414 represents only the change to the map 410), shows the addresses of the backed up blocks 106A, 106B, and a link for block 206D, which points to the image of block 206A. Another advantage of this approach is that the previous backup and incremental backups can be permanently stored. The contents of blocks being deleted and restored (e.g., after software reinstall) should not be backed up repeatedly.

Using pointers to blocks whose content is stored in previous backup sets requires permanent access to those sets. If the volume of sets that can be simultaneously accessed needs to be limited, then a set of predefined rules may be used for using redirection pointers in incremental backups. For example, an earliest backup set where pointers can be used can be defined. If the block content is stored in an earlier backup, then the pointer is not used, and contents of that block is saved in the current backup. This reduces of the number of backup sets used simultaneously, and improves performance during restoration from backup. The criteria of defining the earliest backup set may be, e.g., the total amount of backup sets or the date of earliest backup. Another advantage is the possibility of freeing storage space if storage with fixed capability is used for backing up.

Figure 5:
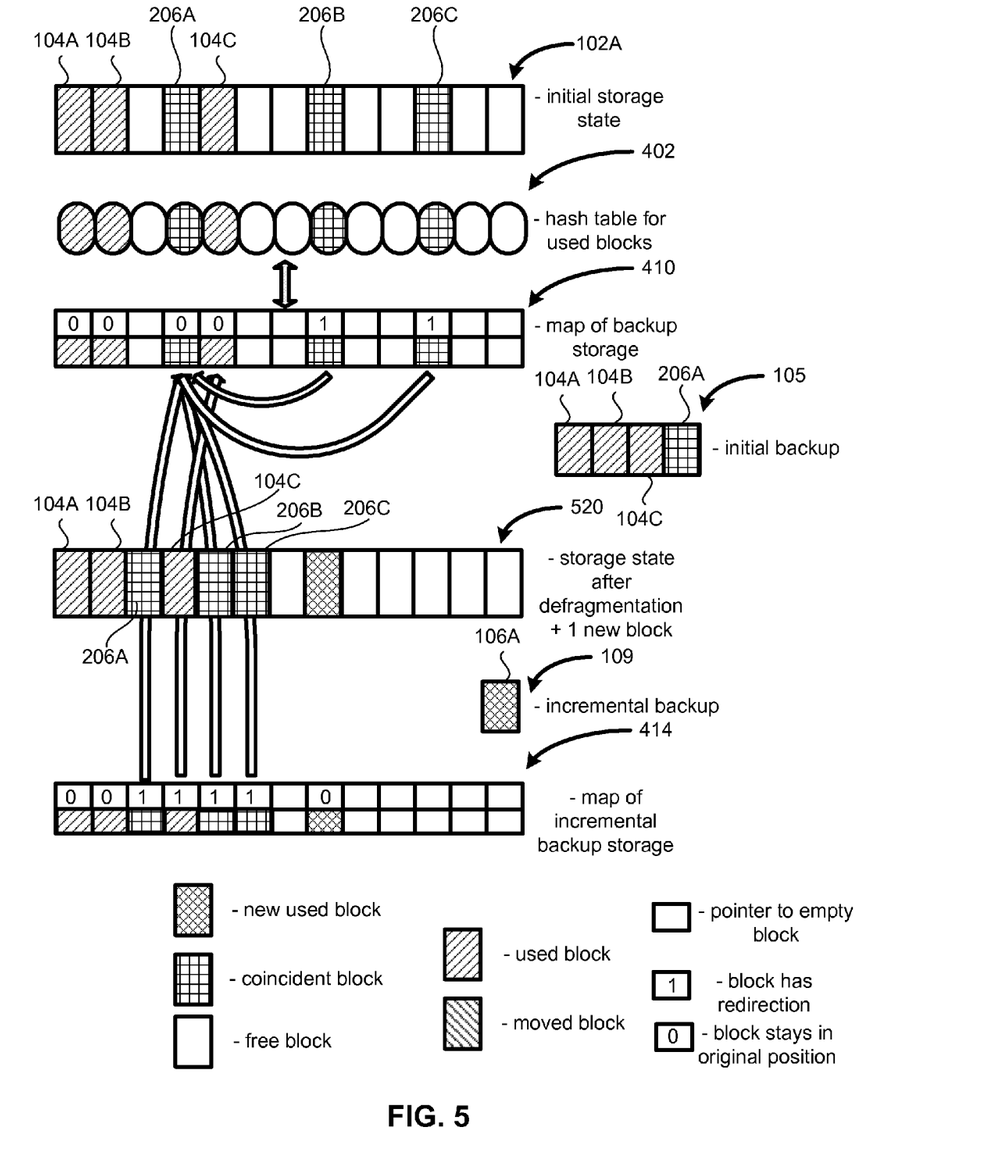
FIG. 5 illustrates how one embodiment of the present invention works in the case of defragmentation of the drive being backed up.

FIG. 5 illustrates how one embodiment of the present invention works in the case of defragmentation of the drive being backed up. 520 in FIG. 5 illustrates the defragmented disk, with a single block 106A added to it. Note that the other blocks are arranged compactly, next to each other. The incremental backup 109 in this case consists of only the single block 106A. The map of the incremental backup in this case uses links to point to the originally backed up blocks—note that the links in this case include not only the blocks 206B, 206C (which are identical to 206A), but also the block 104C, which has been moved on the disk that is being defragmented and backed up, but the contents of that block has not changed. The fact that the contents has not changed can also be verified using the hash value in the table 402 for that block.

Note that a fairly common situation is that the image is stored on a drive that is physically different from the disk drive that is being backed up. However, this need not be the case. For example, the drive on which the image of the disk is created can be physically the same drive, can be a partition of the drive, a logical drive, a network drive, a distributed storage system, etc.

The invention can optionally use an additional step of checking block content coincidence (identity), since hash values do not always provide reliable information.

In the process of storing data in the backup storage, the backup storage can contain two types of data:

1. Block identifier and contents of corresponding block.
2. Block identifier and pointer or identifier of block containing actual data, such as a pointer to a block with the same contents and hash value.

In this case, an indicator or an extra bit in the bitmap can be used to define whether the backup storage contains actual contents or pointer. The size of corresponding data may be used as the indicator, since all pointers contain a similar number of bytes and preferably have equal size.

Figure 7:
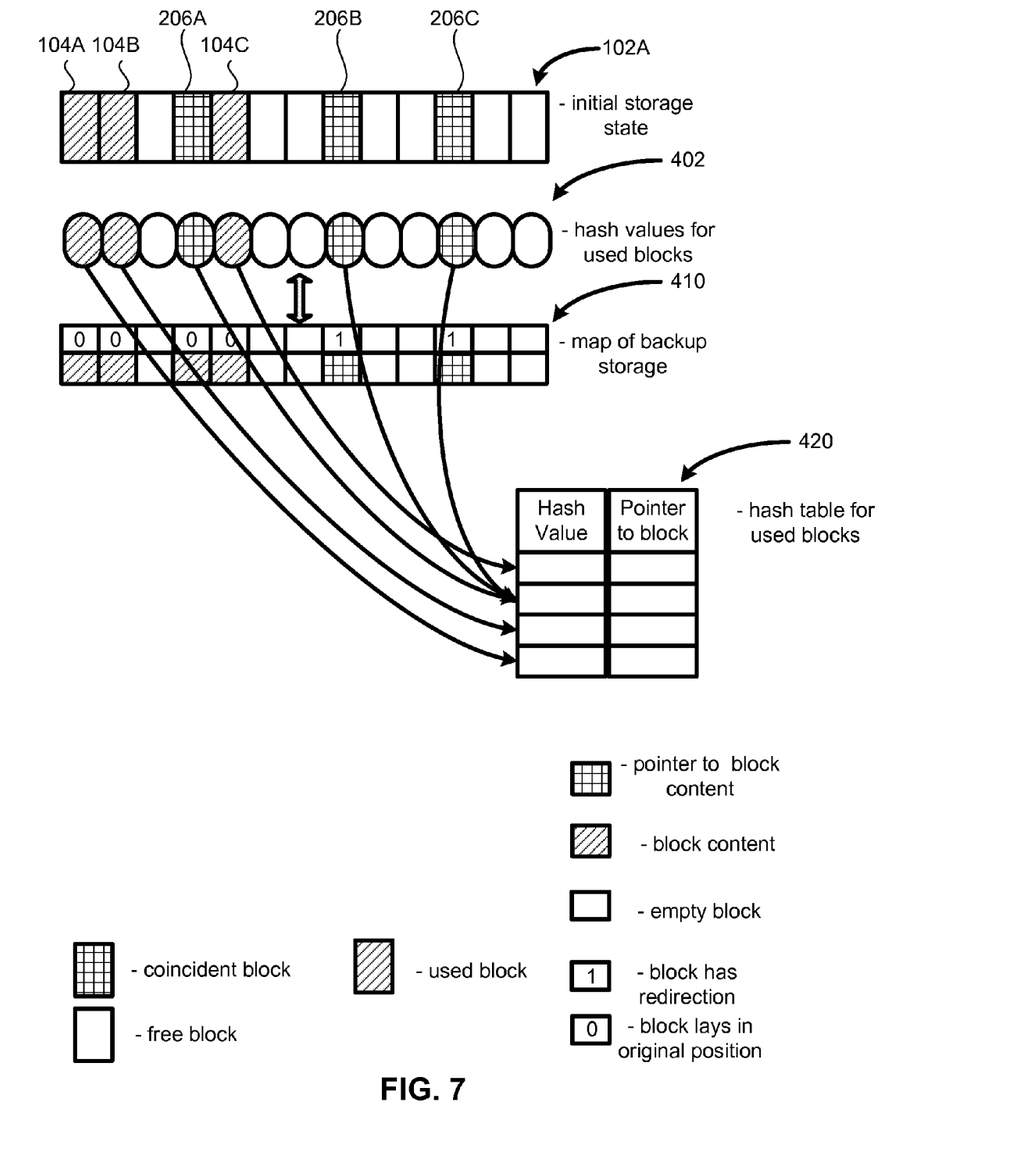
FIG. 7 illustrates the use of hashes in one embodiment of the invention.

FIG. 7 illustrates the use of hashes and maps in one embodiment of the invention. As shown in FIG. 7, a hash table 420 contains hash values and corresponding pointers for the backed-up blocks. In this case, blocks 206A, 206B, 206C contain identical data, and their hashes are therefore identical. Instead of storing blocks 206A, 206B, 206C in the backup, only one block—206A—needs to be stored, and only hash values may be stored instead of the remaining blocks contents. Here, pointers to actual content of blocks are stored in the table 420.

From the perspective of an operating system, a device exists and acts analogously to a hard disk drive or drive partition that can be accessed using operating system mechanisms that access storage devices and appropriate device drivers. When a data block is stored, a hash of the data block is written into a hash table with a pointer referring to a location of this data block (i.e., for example, a location on a backup storage).

A dynamic hash function generates n-bit binary numbers, where n usually equals to 32. The main principle of dynamic hashing is representing a number generated by hash function as a sequence of bits and placing this sequence within segments based on a particular interpretation.

The exemplary embodiment employs dynamic hashing in a form of extended hashing. In the extended hashing, records are continuously added to a first segment until it is completely filled up. At this point, the segment is split into 2i new segments, where $0<i<n$ (typically i=1, which means that the segment is split into two new segments). Segment addresses are stored in a catalog—an address table of segments.

According to the exemplary embodiment, the address of the segment dedicated to storing data having hash value P is stored in a K-cell of the catalog, where K is a decimal number corresponding to the binary number derived from the most significant i bits of the binary number P. After the segments are split, the data previously stored in them is relocated into new segments.

Once the new segment is filled up, the split operation is repeated. Then the catalog contains more addresses of the new segments that store values determined by a larger number of most significant bits of the hash value.

If data is deleted and the segment becomes empty, it can be deleted with its catalog pointer. In one embodiment, small segments can be combined and the catalog can be reduced by half in size. A pointer and a hash value can be referred to as key-value pairs. The key-value pairs are stored in an array of key-value lists. The key-value lists are often called "buckets." The array index is often referred to as the "bucket address."

In a sorted linear hash table, the bucket array size is always identical to the number of entries in the hash table. Therefore, the average number of entries per bucket is expected to be 1. Each insertion causes an addition of one new bucket at the end of the array. Similarly each deletion causes one bucket to be removed at the end of the array.

According to the exemplary embodiment, the bucket array consists of two partitions—the front partition and the expansion partition. The size of the front partition is always powers of 2. Some valid front partition sizes are 0, 1, 2, 4, 8, 16, etc. If a hash table has 7 entries, the front partition size would be 4 and the expansion partition size would be 3.

According to the exemplary embodiment, any type of a hash table employing any hashing technique can be used. For example, dynamic hashing, linear hashing or extendible hashing can be used.

Note that writing hash values corresponding to data blocks with a pointer to the location of the data block on the backup storage takes up a long time, because moving the read/write head to different parts of data requires extra time (e.g., extra accessing of a hard disk).

Writing a large number of hash values with the block location pointers simultaneously takes less time. However, calculated hash values may need to be written into different parts of the hash table. Also, the data blocks can be located in the different partitions of the storage media or can be located on different storage media or volumes.

In order to avoid random read of hash values from the hash table and read of the data blocks from the backup storage, the hash values in the table need to be sorted according to a particular order. Efficient restoration of the backup media (i.e., reading the values from the hash table) needs to be optimized. Reading of the data blocks from the backup storage and writing the data blocks onto the storage media needs to be optimized as well.

According to the exemplary embodiment, writing the hash values into the hash table is optimized by sorting the hash values prior to writing them into the hash table. In order to avoid random access to the disk, the hash files are sorted based on their addresses. An address of a record in the linear hash file, unlike static hash table, is not fixed. The address changes based on added or delete records.

In case of linear hashing, several hash functions are used. Thus, sorting records based on hash values does not solve an optimization problem of writing the records into a hash table. Prior to writing to a bucket, all records belonging to the bucket have to be grouped.

An optimal order of records can be achieved by loading records into a hash file in such a way that it does not cause splitting of the buckets or relocating records within the hash table. In order to avoid splitting of the buckets and relocation of the records, a distribution of records over particular buckets has to be pre-determined prior to writing data (including the data block location pointers).

A number of buckets can be calculated for a hash table (hash file). An address of a destination bucket (i.e., the bucket where the record needs to be stored) can be calculated based on a number of least significant bits of the hash value. At the point where the bucket splits, a number of bits used for addressing are reduced by one.

The exemplary hash values are compared when a backup request for the data blocks for backing up is received.

After sorting of the hash values, the hash values are placed sequentially one after another. Alternatively, the hash values can be sorted out according to a certain criteria, for example, by three, four, etc. last bits of the hash value.

In case when the data blocks subject to the backup are identical (i.e., have coincident corresponding hashes), after the sorting the same hash values are listed one after another. Comparison of hashes can be performed after the sorting operation. The hash values can be compared against the hash table(s) for detecting only unique hash values.

Thus, only the unique hash values (and unique location pointers) are written into the hash table. Detected redundant hashes are not considered. However, the pointers to the redundant data blocks can be stored into a file or a table. Subsequently, deletion of the redundant data blocks from the data storage can be performed. According to the exemplary embodiment, the deletion can be performed based on a user request, at the moment of a least load or free time of the backup server, or after a certain time interval.

Note that the hash tables can be represented by the same table. New hash values can be added to this table along with the location pointers to the backed up blocks 820. The calculated hash values for the data blocks that are subject to backup, are written into the hash tables after being sorted out. Then, the hash values are compared to the hash values corresponding the backed up blocks for determining uniqueness of the corresponding data blocks.

However, the calculated hash values can be first compared against the hash values corresponding to the backed up blocks from the hash table and then sorted out.

Note that a common situation is that the image is stored on a drive that is physically different from the disk drive that is being backed up. A drive on which the image of the disk is created can be physically the same drive, a partition of the drive, a logical drive, a network drive, a distributed storage system, etc.

The exemplary embodiment can optionally use an additional step of checking block content coincidence (i.e., matching), since the hash values do not always provide 100% reliable information. In the process of storing data in the backup storage, the backup storage can contain two types of data:
1. Block identifier and contents of a corresponding block.
2. Block identifier and a pointer or an identifier of a block containing actual data, such as a pointer to a block with the same contents and same hash value.

In this case, an indicator or an extra bit in the bitmap can be used to define whether the backup storage contains the actual contents or the pointer. The size of the corresponding data can be used as the indicator, since all pointers contain a similar number of bytes and preferably have an equal size.

Figure 6:
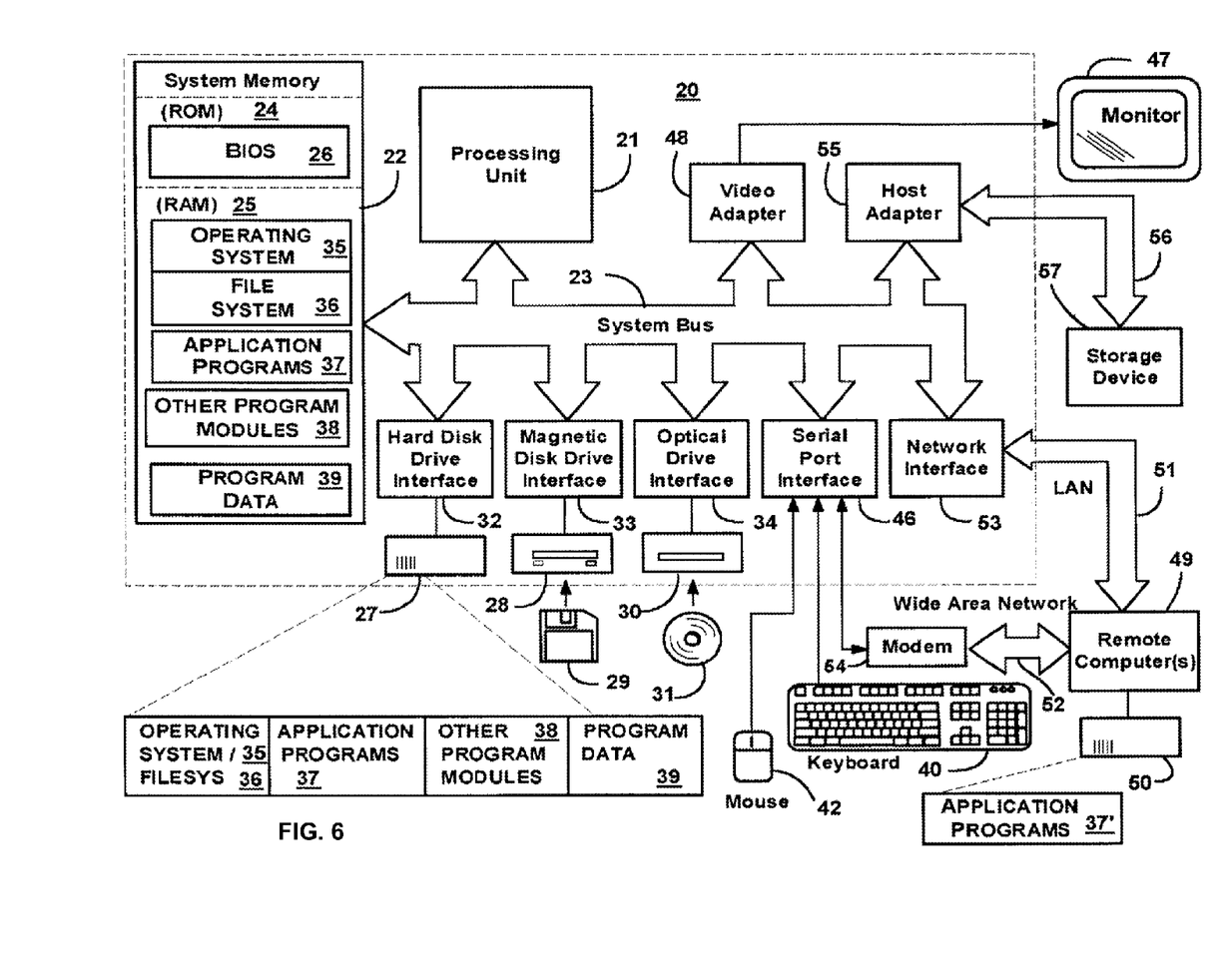
FIG. 6 illustrates an example of a computing system that may be used in the invention.

With reference to FIG. 6, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

It should be noted that in some cases, the same hash values may correspond to blocks with different contents. In this case, in one embodiment of the invention, only one block is reflected in hash table and all other blocks with same hash value but different contents are also stored in subsequent backup sets, even if some of those blocks coincide with each other.

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer implemented method for data backup, the method for data backup executed on a processor, the method comprising:
  (a) forming an image of a storage device, wherein contents of blocks of the storage device are restorable from the image;
  (b) for each block of the storage device to be backed up to the image, generating a hash function value corresponding to contents of that block;
  (c) for each block stored in the image, storing a hash function value in a hash table representing contents of each block;
  (c) for each additional block of the storage device to be backed up to the image, generating a hash function value corresponding to contents of that block;
  (d) sorting all the generated hash function values and deleting duplicate hash values;
  (e) comparing the hash function values to identify, out of blocks of the storage device, candidate blocks that might have identical contents with contents of blocks stored in the image;
  (f) if the hash function values are not coincident, then backing up, to the image, contents of unidentified blocks and blocks that do not have identical hash function values, and
  (g) if the hash function values are coincident, then for blocks of the storage device with identical hash function values, storing links in the image instead of the contents of the blocks;
  (h) after checking all the hash function values for those blocks that need to be backed up, writing only unique hash function values to the hash table;
  (h) wherein links for multiple blocks of the storage device with identical contents point to a single block in the image,
  (i) wherein the image contains a bitmap of the storage device backup;
  (j) the bitmap contains indicators for use of the links, such that an indicator defines if a block contains the content or if the block points to another block,
  (k) wherein the bitmap contains indicators that reflect used and unused blocks such that an indicator of one setting represents a used block whose contents are shared with another block in the image, and a bit of an alternate setting corresponds to an unused block whose contents are unique to every other block in the image; and
  (l) wherein the unused blocks do not require backing up of their contents.

2. The method of claim 1, wherein if the hash function values are coincident, then further comprising comparing contents of candidate blocks with contents of corresponding blocks stored in the image, and backing up, to the image, contents of unidentified blocks and blocks that do not have identical contents.

3. The method of claim 1, wherein the image includes data of different backups.

4. The method of claim 1, wherein the image contains backups of different storage devices.

5. The method of claim 1, wherein hash function is any of MD4, MD5, CRC, CRC32, SHA1, SHA2, SHA512, SHA256, GOST, hash function based on block ciphers and Message Authentication Code (MAC).

6. The method of claim 1, further comprising restoration of the storage device from the image, wherein contents of blocks pointed by link is restored to corresponding blocks of the storage device.

7. The method of claim 1, wherein the link for the block is stored in the image instead of contents of the corresponding block.

8. The method of claim 1, wherein the image includes an indicator reflecting use of the link for the block contents.

9. The method of claim 8, wherein a bitmap is created for the storage device backup; and wherein the bitmap includes indicators for use of the links.

10. The method of claim 9, wherein the bitmap further reflects unused blocks of the storage device; and wherein the unused blocks do not require backing up of their contents.

11. A non-transitory computer useable recording medium having computer program logic stored thereon for executing on a processor for data backup, the computer program logic performing the method of claim 1.

12. A system comprising a processor, a memory, and code loaded into the memory for performing the method of claim 1.

* * * * *